United States Patent
Donderici et al.

(10) Patent No.: US 10,119,394 B2
(45) Date of Patent: Nov. 6, 2018

(54) MULTI-FREQUENCY DIELECTRIC BOREHOLE IMAGER

(71) Applicant: Halliburton Energy Services, Inc., Houston, TX (US)

(72) Inventors: Burkay Donderici, Houston, TX (US); Luis San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 87 days.

(21) Appl. No.: 14/766,492

(22) PCT Filed: Dec. 27, 2013

(86) PCT No.: PCT/US2013/077999
§ 371 (c)(1),
(2) Date: Aug. 7, 2015

(87) PCT Pub. No.: WO2015/099765
PCT Pub. Date: Jul. 2, 2015

(65) Prior Publication Data
US 2015/0361789 A1 Dec. 17, 2015

(51) Int. Cl.
*G01V 3/20* (2006.01)
*E21B 47/16* (2006.01)
(Continued)

(52) U.S. Cl.
CPC .............. *E21B 47/16* (2013.01); *E21B 47/09* (2013.01); *G01V 3/20* (2013.01); *G01V 3/30* (2013.01)

(58) Field of Classification Search
CPC .......... E21B 47/16; E21B 47/09; G01V 3/12; G01V 3/20; G01V 3/30
(Continued)

(56) References Cited

U.S. PATENT DOCUMENTS

| 5,434,507 A | 7/1995 | Beren et al. |
| 5,663,499 A * | 9/1997 | Semmelbeck ........... G01V 3/38 |
| | | 166/250.02 |

(Continued)

FOREIGN PATENT DOCUMENTS

| WO | 2010059275 | 5/2010 |
| WO | 2014003784 | 1/2014 |
| WO | 2014003786 | 1/2014 |

OTHER PUBLICATIONS

International Search Report and Written Opinion of PCT Application No. PCT/US2013/077999 dated Sep. 24, 2014: pp. 1-14.
(Continued)

*Primary Examiner* — Steven Lim
*Assistant Examiner* — Mancil Littlejohn, Jr.
(74) *Attorney, Agent, or Firm* — Chamberlain Hrdlicka

(57) ABSTRACT

Systems, methods and devices for dielectric borehole imagery are disclosed. Systems may include one or more transmitters that induce, at azimuthally-spaced positions on a borehole wall, a plurality of fields having components in non-coplanar directions within a formation; one or more directionally sensitive receivers that sense the components caused by each of the one or more transmitters; and a controller that processes signals received from the one or more directionally sensitive inductive sensors to provide a set of measurements representative of dielectric parameters at two or more azimuthal positions within the borehole.

19 Claims, 15 Drawing Sheets

(51) Int. Cl.
*G01V 3/30* (2006.01)
*E21B 47/09* (2012.01)

(58) Field of Classification Search
USPC ............................. 367/82; 324/338; 702/7
See application file for complete search history.

(56) References Cited

U.S. PATENT DOCUMENTS

| | | | |
|---|---|---|---|
| 6,173,793 | B1 | 1/2001 | Thompson et al. |
| 7,066,282 | B2 | 6/2006 | Chen et al. |
| 7,558,675 | B2 * | 7/2009 | Sugiura .................. G01V 11/00 |
| | | | 702/6 |
| 7,733,093 | B2 * | 6/2010 | Homan .................... G01V 3/28 |
| | | | 324/339 |
| 8,636,061 | B2 * | 1/2014 | Mosse ...................... G01V 3/30 |
| | | | 166/250.01 |
| 2005/0068036 | A1 | 3/2005 | Wang et al. |
| 2006/0031017 | A1 * | 2/2006 | Mathieu .................. G01V 3/20 |
| | | | 702/6 |
| 2010/0026305 | A1 | 2/2010 | Yanzig |

OTHER PUBLICATIONS

Bittar et al., "A Modern Microwave Formation Evaluation Sensor and Its Applications in Reservoir Evaluation," SPWLA 51st Annual Logging Symposium, Jun. 2010: pp. 1-10.
Hizem et al., SPE 116130: "Dielectric Dispersion: A New Wireline Petrophysical Measurement," SPE International, 2008: pp. 1-21.

\* cited by examiner

MULTI-FREQUENCY DIELECTRIC BOREHOLE IMAGER

FIELD

The present application relates generally to borehole imagers usable in a bore in a subterranean formation and, more particularly (although not necessarily exclusively), to systems and methods for combined dielectric and resistivity borehole imagery.

BACKGROUND

Oil field operators demand access to a great quantity of information regarding the parameters and conditions encountered downhole. A wide variety of logging tools have been and are being developed to collect information relating to such parameters as position and orientation of the bottom hole assembly, environmental conditions in the borehole, and characteristics of the borehole itself as well as the formations being penetrated by the borehole.

Among such tools are resistivity logging tools, which measure the electrical resistivity of a formation within a borehole. These tools cause electrical currents to flow within the formations to determine the formation's resistivity. A high resistivity measurement within a porous formation can indicate that hydrocarbons are present in the formation.

The electrical resistivity of a formation is generally anisotropic, i.e., the formation's resistivity will vary depending upon the orientation of an electrical current flowing through the formation. The measurements obtained by a resistivity logging tool may thus vary depending upon the orientation of the current induced in the formation and used by the tool to measure the formation's resistivity. Further, both structural anisotropy (i.e., anisotropy caused by differing formation layers) and intrinsic anisotropy (i.e., anisotropy caused by the grains that make up the material of each layer) may both be present. The intrinsic anisotropy of a given formation layer, however, may not be detectable by resistivity logging tools with measurement resolutions measured in feet or meters, rather than inches or centimeters. Such low resolution tools may thus not fully characterize the anisotropy of the formation at both an intrinsic and structural level, producing an incomplete and possibly misleading characterization of the formation.

As noted, additional information is useful about parameters and conditions downhole. Tools with capabilities in addition to resistivity measurements would be desirable to measure and analyze various other properties of the formation. Existing borehole imagers may make isotropic resistivity images of formation. No dielectric imagers exist that discuss multi-frequency dielectric imaging application and with a focus on single frequency measurements. Making images of additional petrophysical parameters also has not been addressed.

BRIEF DESCRIPTION OF THE DRAWINGS

Accordingly, there are disclosed in the drawings and the following detailed description specific embodiments of multi-frequency dielectric borehole imaging tools and methods. In the drawings.

Figure 1:
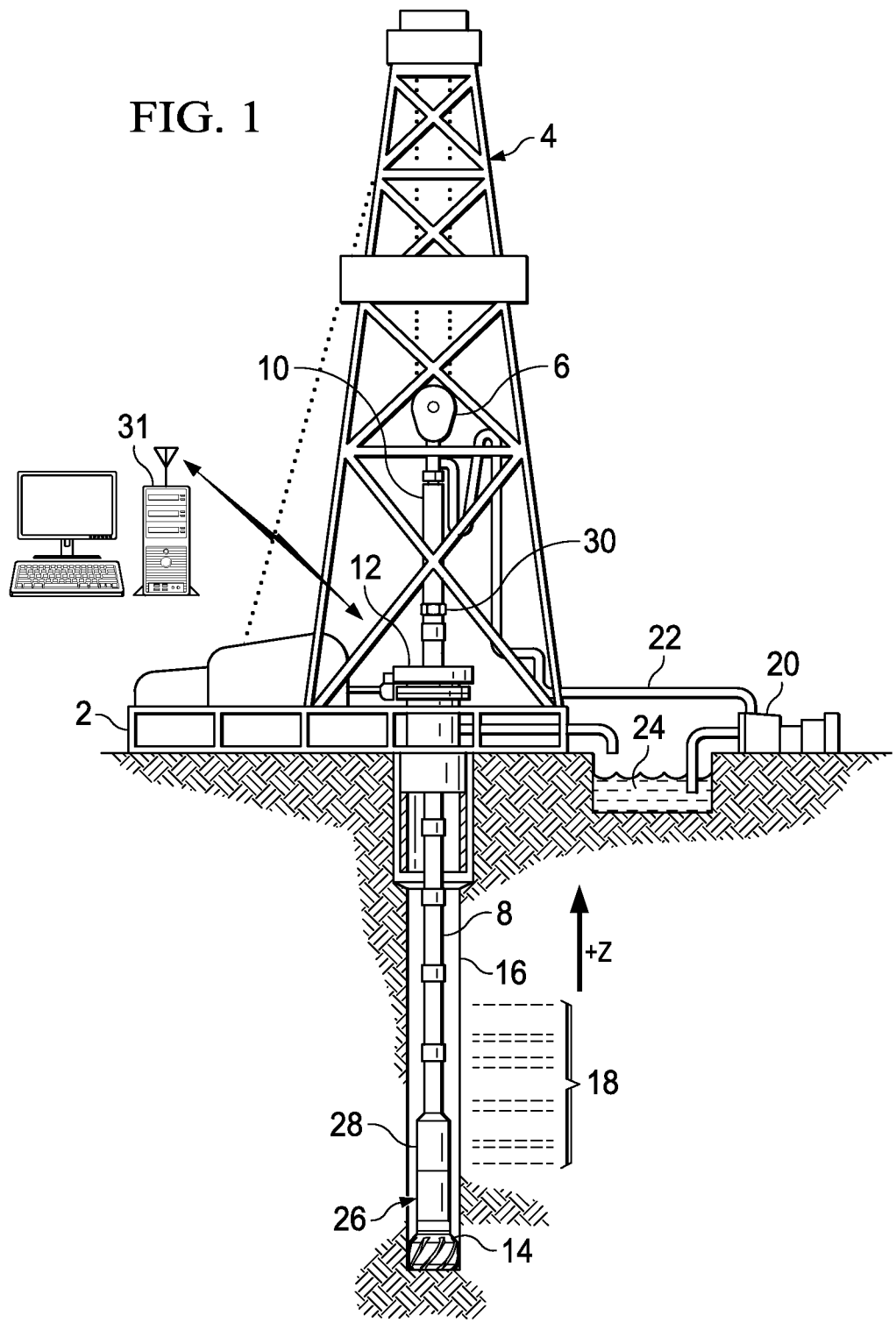
FIG. 1 shows an illustrative logging while drilling environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The paragraphs that follow describe illustrative multi-frequency dielectric borehole imaging tools and systems, as well as methods for using such tools and systems. Various environments suitable for the use of these tools, systems and methods are first described, followed by example tools. The sensor pads of these tools are then functionally described, and specific inductive and galvanic transducer pad embodiments are subsequently described. An illustrative system is then described together with the flow of data through the system that produces the imaging data. Examples illustrate how the imaging data may be presented as one or more graphical logs. Finally, an illustrative method for using the described tools and systems is described.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer measurement data to a receiver within surface module 30, which may forward the data to computer system 31 for further processing. Telemetry sub 28 may also receive commands from surface module 30 originated from computer system 31. Data and/or commands may be transferred between surface module 30 and computer system 31 wirelessly (as shown), or via electrical conductors and/or optical cables (not shown).

Figure 2:
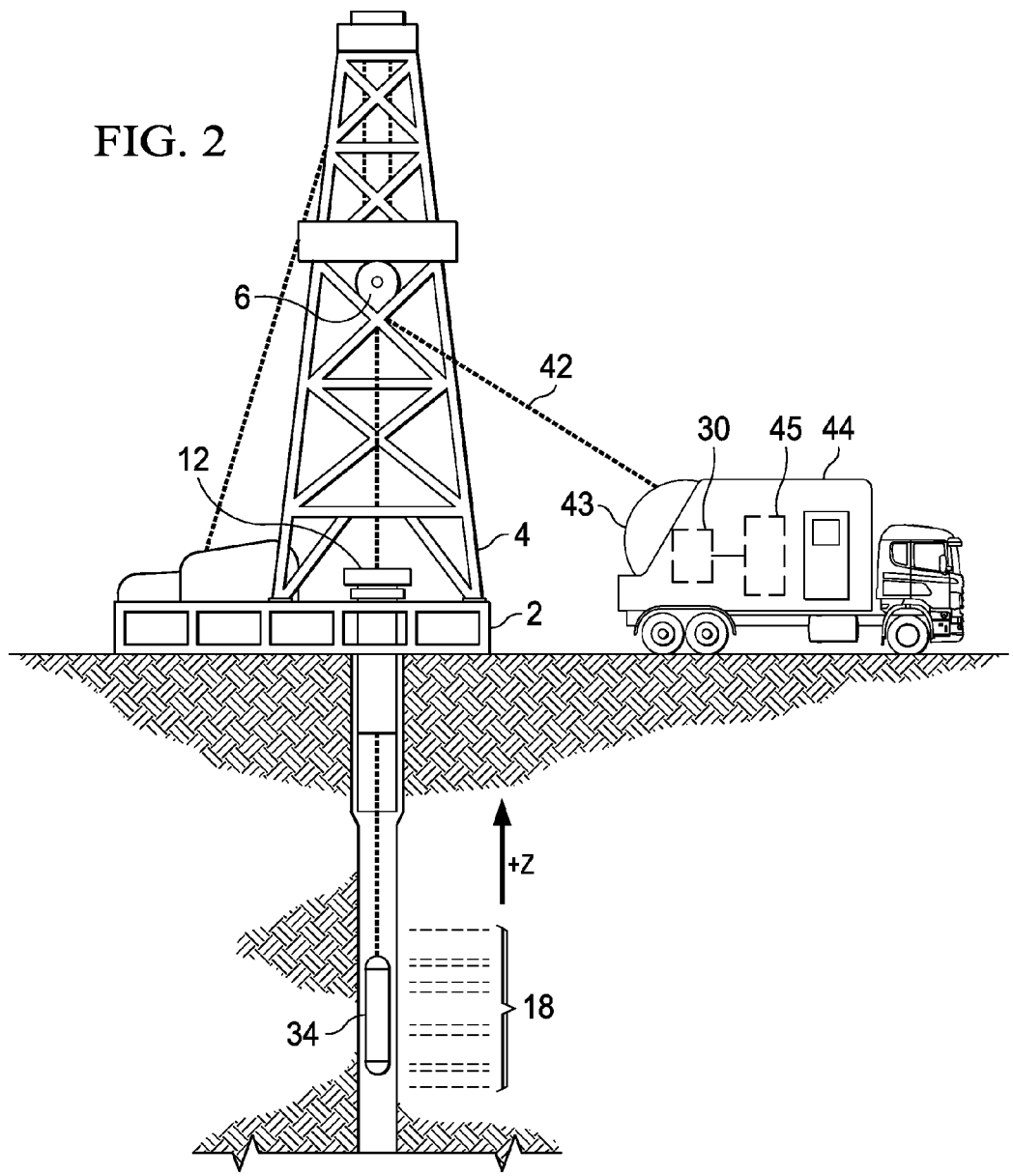
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 34, i.e., a sensing instrument suspended by a cable 42 deployed from reel 43 and having conductors for transporting power to the tool and telemetry from the tool to the surface (as shown). A wireline logging tool 34 may have pads and/or centralizing springs (not shown) to maintain the tool near the axis of the borehole as the tool is pulled uphole. The pads may also house transducers used to determine at least some characteristics of the surrounding formation, as described in more detail below. A surface logging facility 44 may collect measurements from the logging tool 34, and may include a surface module 30 coupled to spool 43 and a computer system 45 for processing and storing the measurements gathered by the logging tool. In at least some alternative embodiments, telemetry may be communicated between the tool and computer system 45 wirelessly (not shown).

Figure 3:
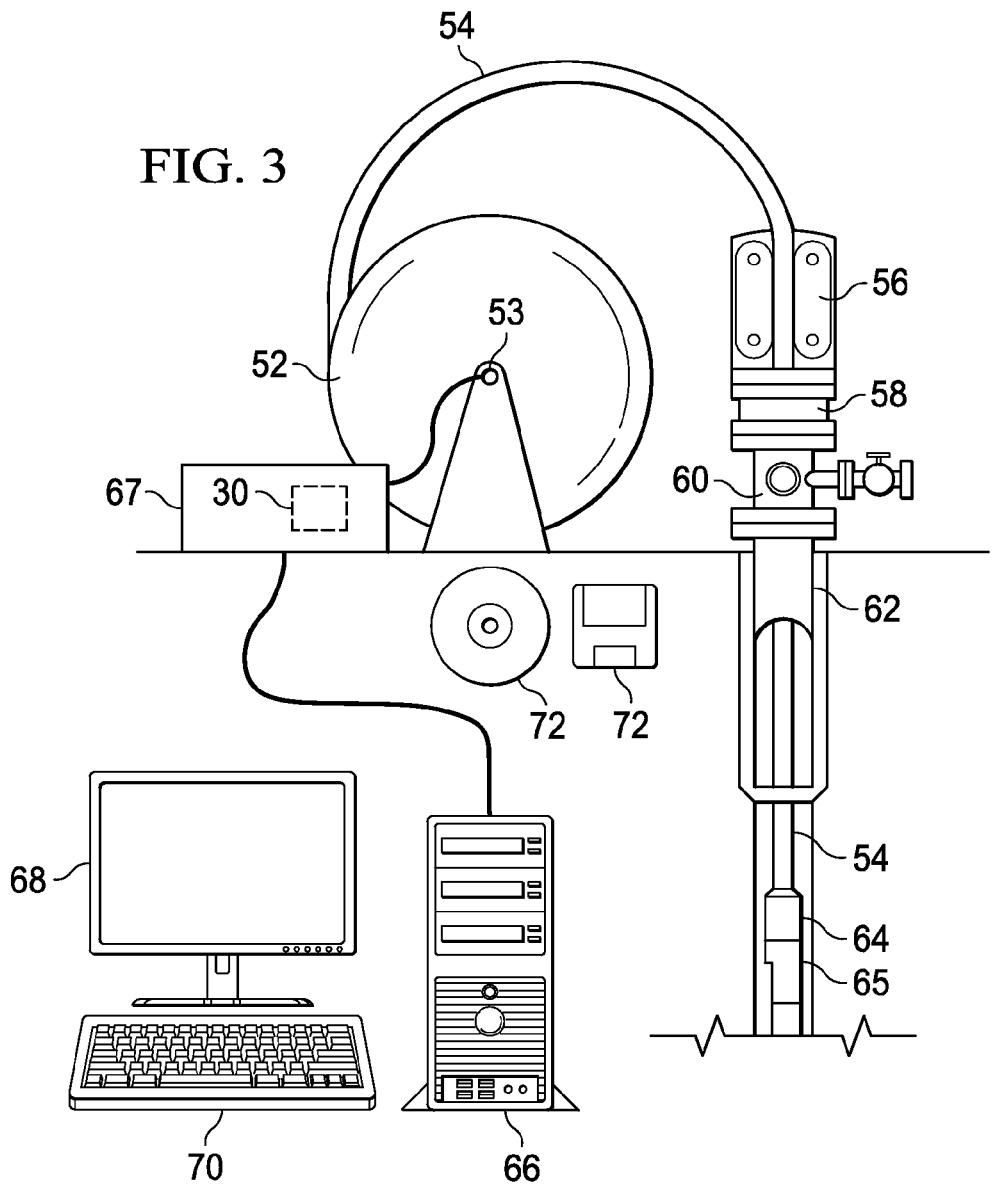
FIG. 3 shows an illustrative tubing-conveyed logging environment.

An alternative logging technique is logging with coil tubing. FIG. 3 shows an illustrative coil tubing-conveyed logging system in which coil tubing 54 is pulled from a spool 52 by a tubing injector 56 and injected into a well through a packer 58 and a blowout preventer 60 into the well 62. (It is also possible to perform drilling in this manner by driving the drill bit with a downhole motor.) In the well, a supervisory sub 64 and one or more logging tools 65 are coupled to the coil tubing 54 and optionally configured to communicate to a surface computer system 66 via information conduits or other telemetry channels (e.g. via electrical conductors, optical fibers, or wirelessly). An uphole interface 67 may be provided to exchange communications with the supervisory sub and receive data to be conveyed to the surface computer system 66.

Surface computer system 66 of FIG. 3 may be configured to communicate with supervisory sub 64 during the logging process or alternatively configured to download data from the supervisory sub after the tool assembly is retrieved. Surface computer system 66 is preferably configured by software (shown in FIG. 3 in the form of removable storage media 72) to process the logging tool measurements. System 66 includes a display device 68 and a user input device 70 to enable a human operator to interact with the system software 72. In each of the foregoing logging environments, the logging tool assemblies preferably include a navigational sensor package that includes directional sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) angle from the high side of the borehole. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the logging assembly can be determined. Additionally, a three axis magnetometer measures the earth's magnetic field vector in a similar manner. From the combined magnetometer and accelerometer data, the horizontal angle of the logging assembly can be determined. These orientation measurements, when combined with measurements from motion sensors, enable the tool position to be tracked downhole.

In these and other logging environments, measured parameters are usually recorded and displayed in the form of a log, i.e., a two-dimensional graph showing the measured parameter as a function of tool position or depth. In addition to making parameter measurements as a function of depth, some logging tools also provide parameter measurements as a function of rotational angle. Such tool measurements can be displayed as two-dimensional images of the borehole wall, with one dimension representing tool position or depth, the other dimension representing azimuthal orientation, and the pixel intensity, pattern or color representing the parameter value. Among the measured parameters that may be presented as part of a log are resistivity measurements, which can include measurements that reflect the anisotropy of the borehole formation. Such measurements include, but are not limited to, vertical resistivity, horizontal resistivities in one or more directions, formation dip and formation strike. Other parameters, such as anisotrophy ratio may also be displayed.

Various information may be presented to a user. The presentation may include constructing a two dimensional image of the dielectric constant where the dimensions of the image are azimuthal and axial directions. The presenting may include constructing a two dimensional image of the dielectric constant where the dimensions of the image are radial and axial directions.

The one or more borehole characteristics may include dielectric parameters, and wherein the one or more borehole characteristics may include dielectric constant in two different directions, and wherein said two different directions are horizontal and vertical directions. The one or more borehole characteristics may include dielectric parameters and resistivity. Dielectric and resistivity parameters may be obtained at each frequency. Petrophysical calculations may be used to compute water saturation, water porosity, cement exponent, cation exchange capability, and combinations thereof.

The one or more borehole characteristics may include one or more characteristics selected from the group consisting of: water saturation, water porosity, cement exponent, cation exchange capability, and combinations thereof. The presentation may include constructing a two dimensional image of the water saturation, water porosity, cement exponent, cation exchange capability where the dimensions of the image are azimuthal and axial directions. The presentation may include constructing a two dimensional image of the water saturation, water porosity, cement exponent, cation exchange capability where the dimensions of the image are radial and axial directions.

Electrical anisotropy is a property of formations that dictates how differently the formation reacts to electromagnetic fields that are oriented in different directions. Anisotropy can be categorized into two types based on the physical scale and mechanism. Intrinsic anisotropy is formed mainly due to sedimentation and other chemical processes that result in direction dependent size, shape or distribution of the grains that make up the material. Macro anisotropy is mainly formed by laminations that are composed of alternating litology. Both types of anisotropy are closely related to petrophysical and stratigraphic properties of formations. They need to be taken into consideration for accurate interpretation of electromagnetic sensor data such as resistivity or dielectric constants. Here dielectric constant is used to denote the effective dielectric permittivity of a rock divided by the dielectric permittivity of free space.

Figure 4A:
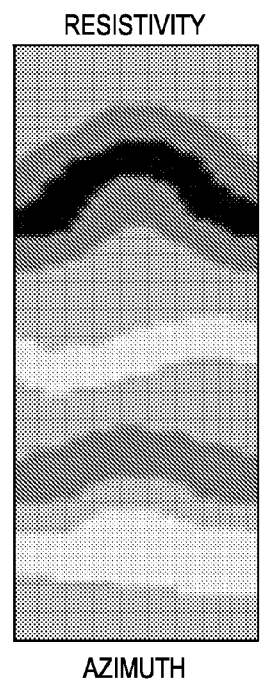
FIGS. 4A-4B shows an illustrative set of graphical borehole logs in a standard imager versus an intrinsic anisotropy dielectric imager.
Figure 4B:
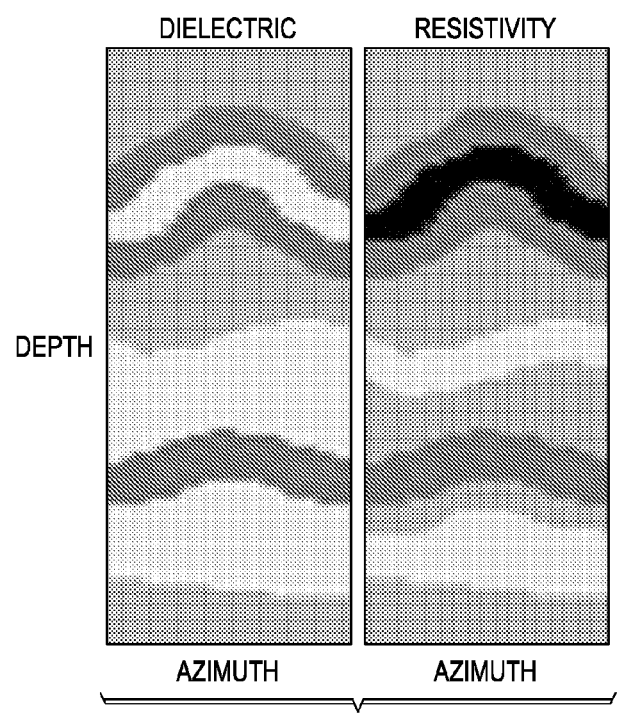

In logging of wells for hydrocarbon production, traditional borehole resistivity measurements make an image of the resistivity of formations. They are used to investigate shallow and smaller features around the borehole such as fractures, borehole deformities, dip of intersecting formation beds as shown in FIG. 4A. Embodiments described herein may produce dielectric images of boreholes with our without resistivity images as shown in FIG. 4B. Such dielectric imager may operate at higher frequencies and may make electromagnetic propagation measurements based on the phase difference and attenuation between different points along the borehole between a multitude of closely spaced transmitters and receivers. At each position along the borehole, phase difference and attenuation may be converted to dielectric constant and resistivity, which can be plotted as an image as shown in FIG. 4B. In certain embodiments, the systems and methods may provide a set of measurements representative of dielectric parameters at two or more azimuthal positions within the borehole.

Embodiments described herein can be used to make detailed images of the boreholes where dielectric, resistivity, water saturation, water porosity, cementation exponent and CEC properties of each feature in the image is identified. Such images can be used to do advanced petrophysical and geological interpretation of subterranean formations. It can also be used to better investigate azimuthal anomalies such as fractures along the borehole and help optimize well placement and production.

Sensor Configuration

Figure 5A:
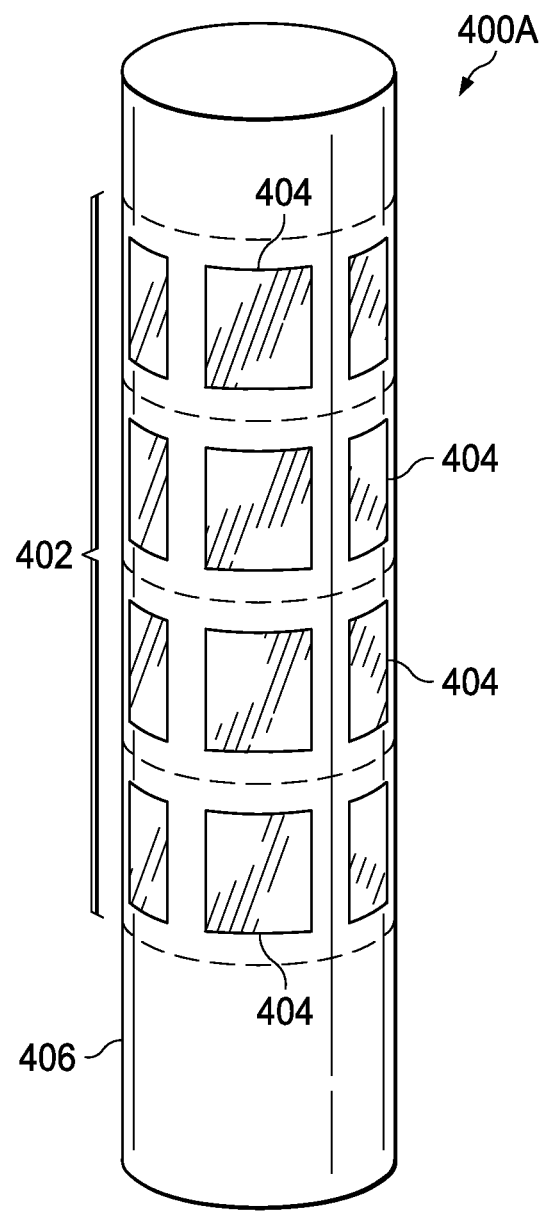
FIGS. 5A-5B show illustrative logging while drilling and wireline logging tools.
Figure 5B:
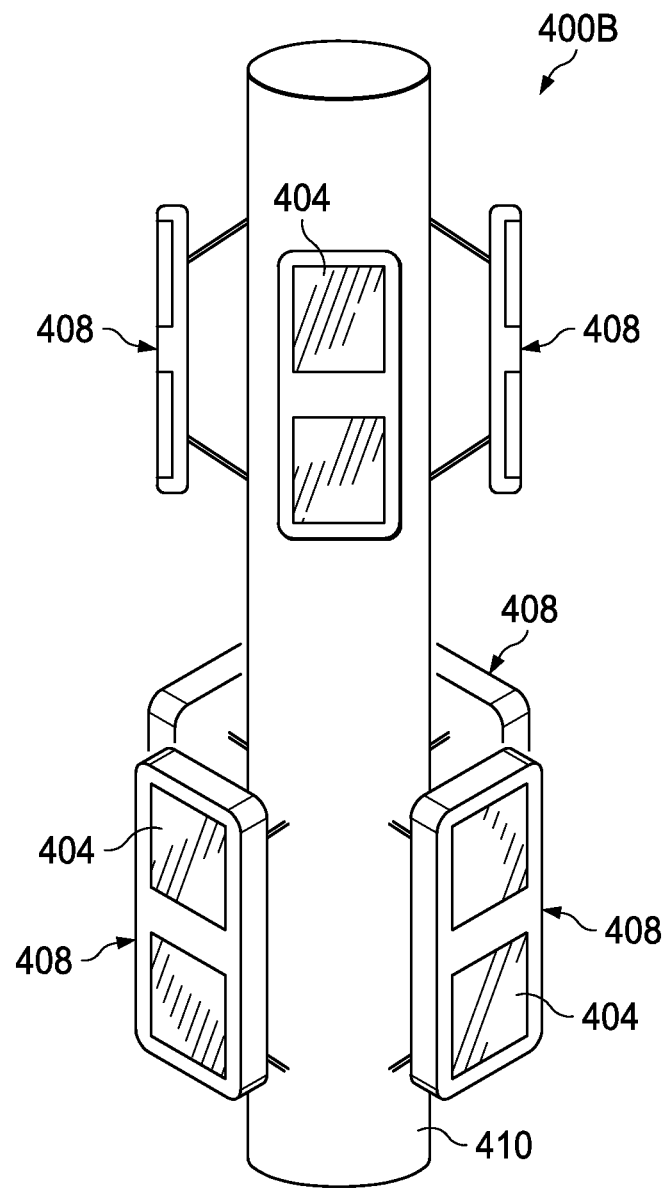

FIGS. 5A-5B show illustrative downhole tools suitable for taking such measurements. As shown in the figures, the tool may include sensor arrays that are distributed along axial and azimuthal directions. Each sensor array may include at least one transmitter to induce current or electromagnetic fields in the formation, and at least one receiver to measure a complex voltage as a function of properties of the formation. In certain embodiments, at least one of a plurality of fields have a different frequency compared to the others.

FIG. 5A shows an illustrative LWD tool 400A, which may include an array 402 of sensors 404. Each sensor 404 may include a transmitter, a receiver or both, as well as additional structures and electronics as described in more detail below. The sensors 404 may be positioned either inside cavities within a drill collar 406, such as a steel collar, or embedded in one or more non-conductive sections of the collar. Sensors 404 may be protected from drilling effects by a non-conducting material, wrapping, coating, or a multitude of small openings or slots. Techniques for placing transducers on and within drilling pipes and collars are well known in the art and are not discussed further. Alternatively, an array 402 with fewer transducers 404 (e.g., a single sensor or a single vertical line of sensors) may be used, with the timing of measurements being arranged to exploit the drillstring's rotation to produce measurements at multiple azimuthal locations around the borehole as drilling commences.

In certain embodiments, sensors and the borehole wall may have a considerable distance between them which is, in general, filled with mud. In this case, certain types of mud work well with certain types of sensors. For example, inductive sensors may be used with oil based mud, and galvanic sensors may be used with water based mud. Sensors may be placed at a larger outer diameter to reduce the standoff between them and the formation.

FIG. 5B shows illustrative wireline logging tool 400B, which includes eight sensor pads 408. Other numbers and arrangements of sensor pads 408 are possible depending on specific applications. Each sensor pad 408 may include one or more sensors 404 similar to those used with LWD tool 400A. Sensor pads 408 may extend from a main body 410 of wireline logging tool 400B by standoffs that position sensor pads 408 near or against the borehole wall. The sensor pads 408 can extend or retract based on the borehole shape and they can keep the sensors 404 in close proximity to the borehole wall. Due to this functionality, it may not be mechanically feasible to make contact at all azimuthal angles along the borehole, and measurements may be made at a relatively small number of azimuthal positions. Multiple stations of arms can be used to increase the number of azimuthal samples. For example, in the figure, a total of eight arms are available, four at each station. In normal wireline operation, very small rotation may be present on the tool string and measurements at different depths may correspond to different azimuths. A separate device is usually used to keep track of tool azimuth relative to earth. As a result, angle of tool measurements with respect to earth axis is known and it is used in the subsequent processing, inversion and visualization. In all cases, a depth shift can be applied to signals from transmitter-receiver station pairs that are not collocated and that have substantially same transmitter-receiver separation. The depth shift can be adjusted to ensure both pairs are sensitive to substantially the same vertical position at the borehole wall.

This configuration and method may reduce the effect of the drilling fluid on the measurements and may also provide better coupling between sensors 404 and the formation. Such improved coupling, together with a reduced spacing of sensors relative to other logging tools, may help to improve the sensitivity of the tool and the resolution of the log image produced.

There are three main criteria to achieve azimuthal imaging: sensitivity to dielectric, vertical resolution and depth of investigation. Sensors that can achieve these are shown in FIG. 6.

Figure 6:
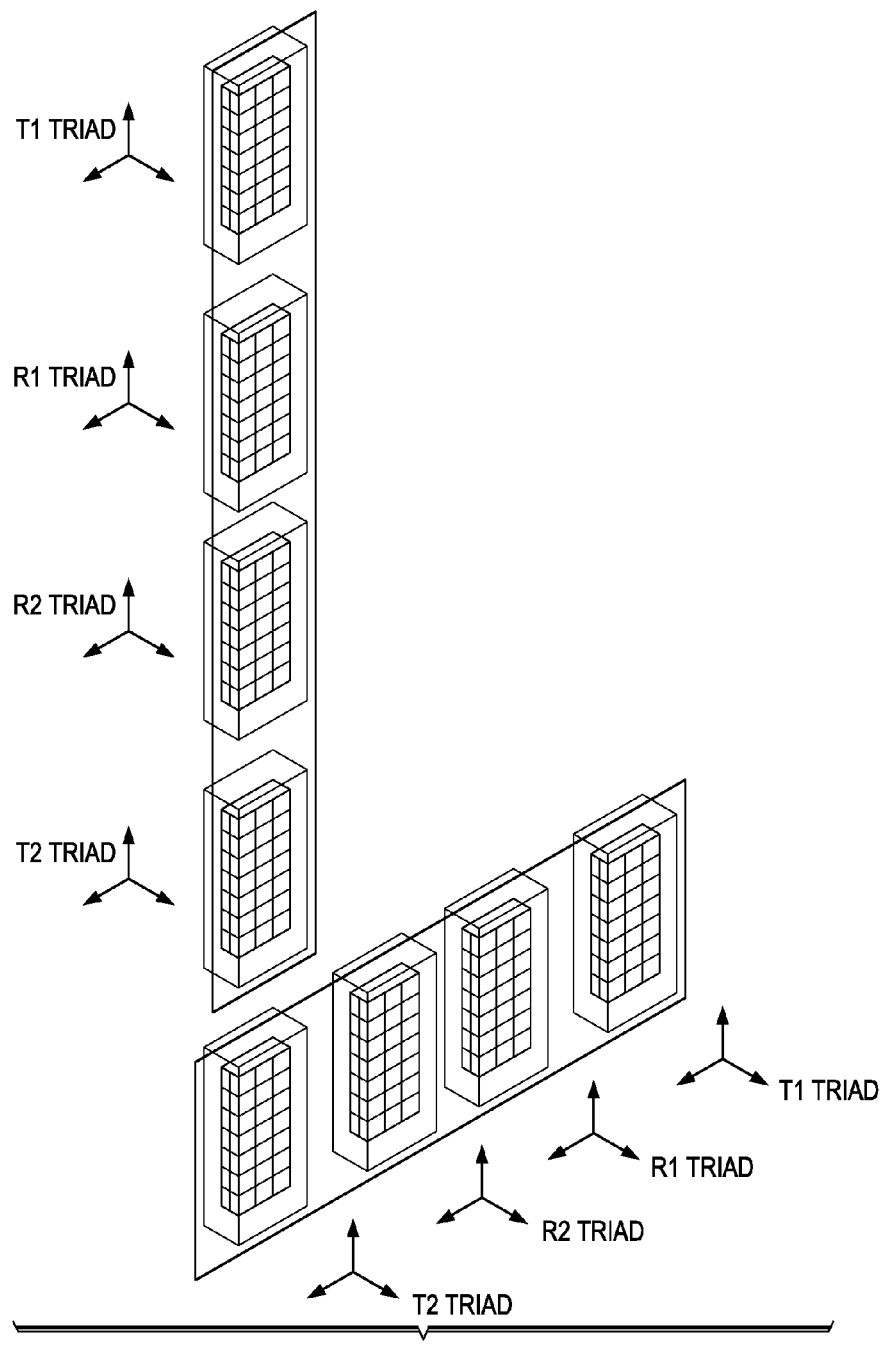
FIG. 6 shows two configurations of a single sensor with two receivers.

Sensitivity of a tri-axial induction sensor in FIG. 6, on the left, to dielectric constant is already well-known, and it is being used, on a larger scale, in high-frequency dielectric technology. In general, three orthogonal electric or magnetic dipoles may be used to generate electromagnetic fields with different orientations, and the signals that are generated by the dipoles may be received at the receivers which are also composed of three dipoles each. Due to particular wavelengths associated with the formation, a phase difference and amplitude ratio, attenuation, can be measured in between the first and second receivers. Traditionally, two transmitters, one at the top and one at the bottom are used for compensation of borehole and other multiplicative effects. Even though this is the standard implementation method for such measurement, certain variations are also possible. A second dipole can be removed and a phase and amplitude measurement can be made with respect to the transmitter signal or a calibration reference. For such measurement, a stable electronic phase or amplitude reference may be used. Transmitter and receiver roles may be interchanged due to electromagnetic reciprocity; triads may be composed of coils that are not orthogonal to each other or the tool axis; certain components can be neglected for manufacturing efficiency. The cavity in which the dipoles are placed can be filled with a high dielectric material to increase the radiation efficiency of the antenna by operating it closer to resonance.

It is also possible to arrange the transmitter and receivers of the sensor horizontally as shown in FIG. 6 on the right hand side. This type of configuration may be more sensitive to vertical features along the borehole, whereas the configuration of FIG. 6A may be more sensitive to horizontal features.

Figure 7:
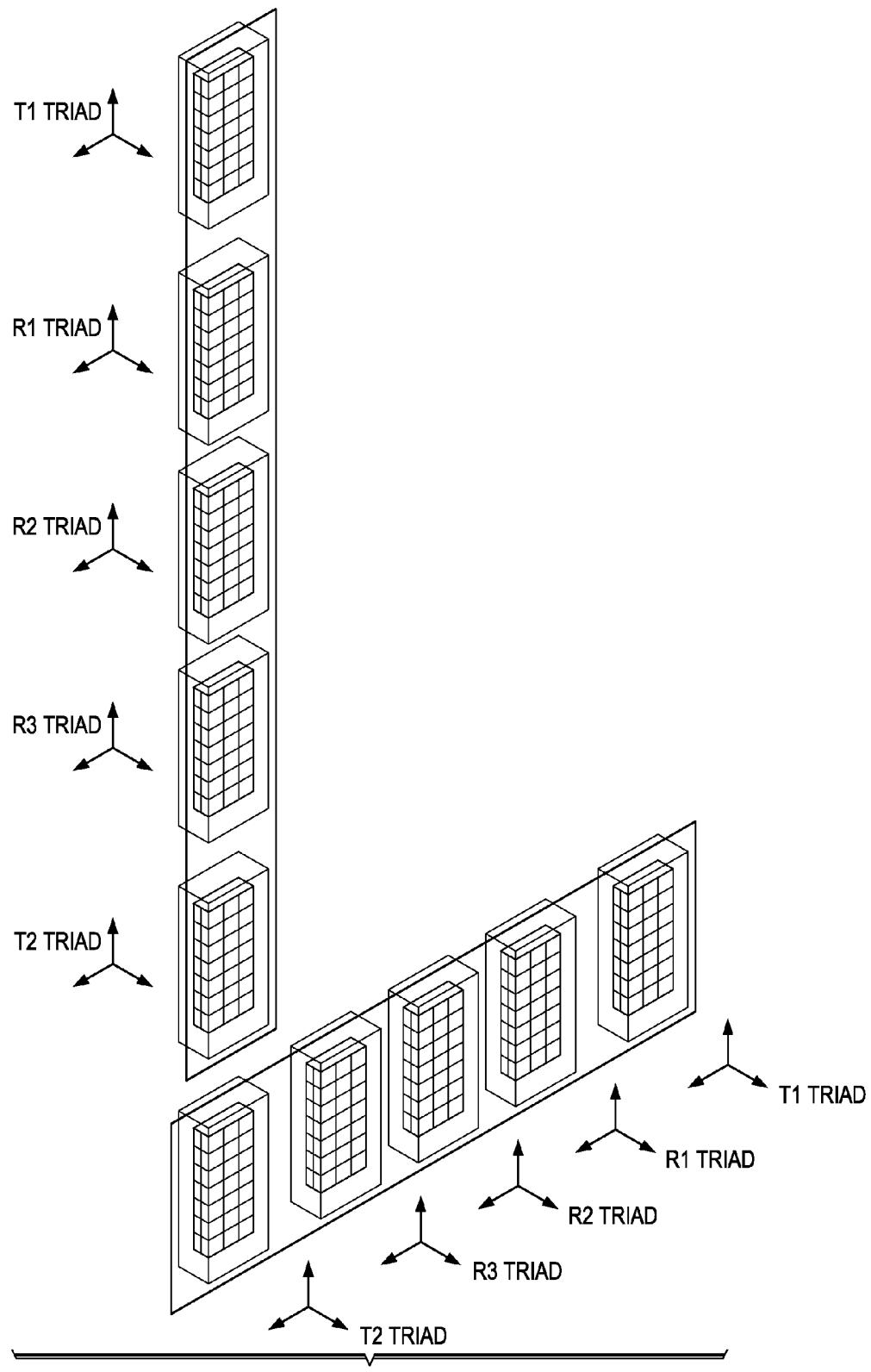
FIG. 7 shows two configurations of a single sensor with three receivers.

FIG. 7 shows another embodiment with three receivers. The configuration in FIG. 7 can be used to avoid phase ambiguity issues with certain 2-receiver configurations. In particular, when the phase difference between top-most and bottom-most receivers become larger than 360 degrees, phase difference between middle and one of the other receivers may be used. This may avoid the phase wrapping of 360 degrees and expand the operating range of the device especially to more conductive or higher dielectric permittivity cases.

Figure 8:
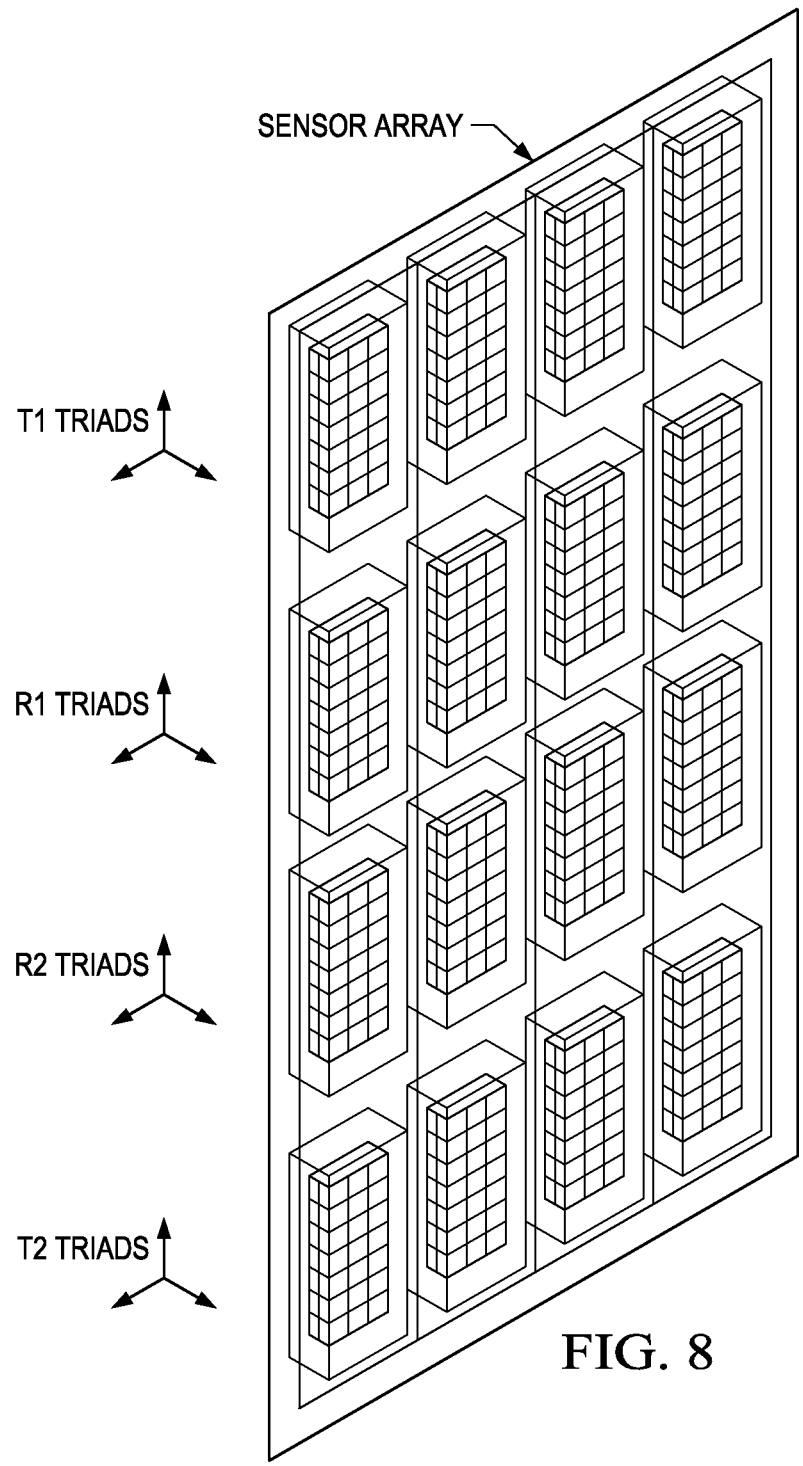
FIG. 8 shows an illustrative sensor array.

FIG. 8 shows another embodiment with several sensors located next to each other to form the sensor array. Each element in the array may be oriented and placed to conform to the shape of the borehole in a non-planar fashion. Each array may be composed of uniform or non-uniform spaced sensors, which may be a mix of vertical and horizontal placement. Such configuration can be used to obtain high resolution images of both horizontal and vertical features. It is also possible to combine horizontal and vertical features in software to obtain an image that is ideal for both.

Data Acquisition

Figure 9:
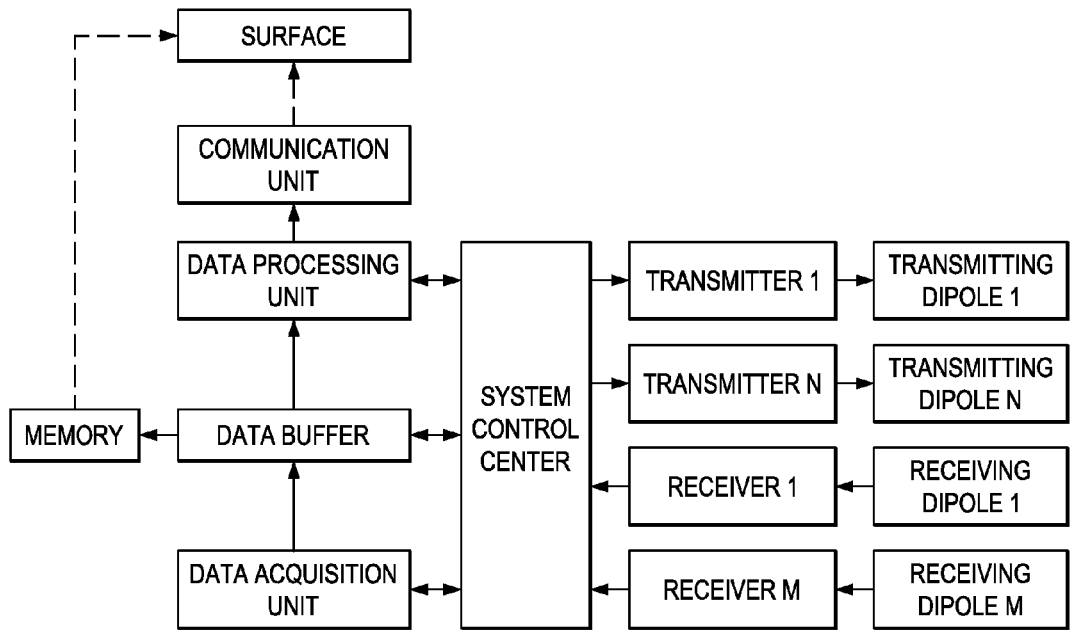
FIG. 9 shows an illustrative data acquisition system.

An exemplary data acquisition system is illustrated in FIG. 9. A system control center may include either a CPU unit or analog electronics that manages operation of other units. It may activate the transmitting antennas/electrodes and may receive the signal from the formation at the receiving antennas/electrodes. In general, each transmitter is sequentially activated and signals at the receivers are simultaneously recorded. A focusing hardware (not shown) can be used, in the case of galvanic tools, as a feedback mechanism to adjust the magnitude of the injected current based on the received signal levels. Hardware focusing is well-known with their use in Laterolog devices and it will not be discussed in detail here. A signal with a certain transient or periodic signature may be generated by the transmitting source. The receiver system operation may or may not be synchronized with the source activation. Synchronization may allow better control on the phase of the received signal if no ratio of signals due to different transmitters or receivers are being used in processing. A received transient signal can be digitized and recorded as a function of time, and it can be later converted to frequency with a Fourier transform operation. It can be alternatively passed through an analog band-passed filter so that only the response at a discrete set of frequencies is recorded. Finally, the signal received by the receivers are stored in the buffer, processed, stored, and if necessary, communicated to the surface.

Pre-Processing

Figure 10:
FIG. 10 shows an illustrative pre-processing methodology.

An exemplary pre-processing methodology is shown in FIG. 10. Pre-processing may be applied to the received signals to convert them into a form that is more suitable to apply further algorithms, such as inversion. The received frequency domain signals may be in complex Phasor form which includes real (in-phase) and imaginary (out-of-phase) parts, or alternatively amplitude and a phase depending on the type of acquisition methodology used. In cases where signals are measured as real and imaginary, phase and amplitude can be computed by applying a well-known Phasor transformation. The signals may correspond to absolute signals, i.e., referenced to the transmitter amplitude and/or phase. They may also correspond to relative signals, i.e. referenced to amplitude and phase of another receiver. In the latter case, amplitude ratio may be called "attenuation" and phase is called "phase difference".

A temperature correction may be applied to remove any electronics or mechanical drift that may occur in the signal due to temperature changes. Calibration is used to remove the effect of unknown amplifier gain, unknown manufacturing variations and also the effect of tool body. Usually, a set of measurements are recorded in a known environment where tool response can be modeled and modeling responses are mapped to the tool's readings to remove any undesired effects that invalidate modeling. Note here that subscript i is the transmitter index (or polarization), j is the receiver index (or polarization), z is the measurement (logging) depth and $\phi_t$ is the azimuth angle of measurement with respect to an earth reference.

Inversion (Isotropic)

Figure 11:
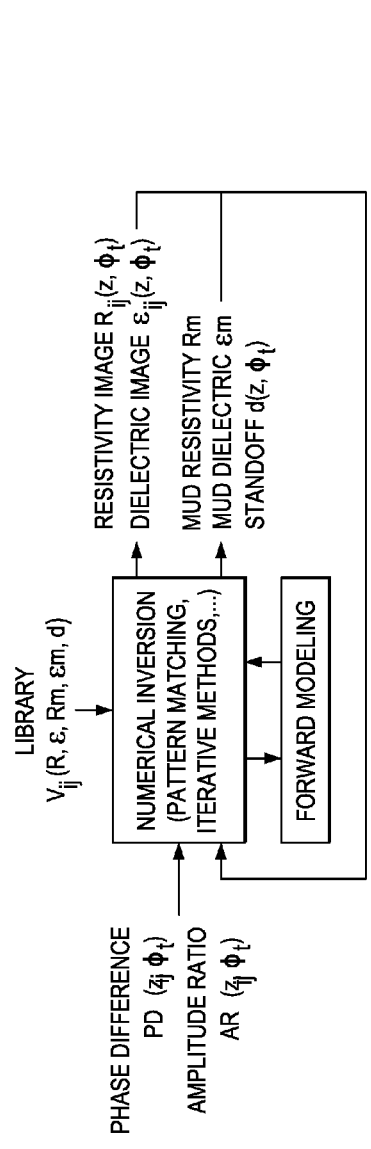
FIG. 11 shows an illustrative isotropic inversion methodology.

A basic inversion methodology is shown in FIG. 11. A signal may be obtained from the receivers as a function of z and $\phi_t$.

Parameters that are related to electric permittivity effects, in general, are not simple functions of the tool response. As a result, a simple algebraic function cannot be used to obtain the desired parameters. Instead, an inversion scheme is used to match the received signal, either to a forward model, or to a modeling library. The library is composed of at least the desired formation parameters: resistivity $R_{ij}(z,\phi)$ and dielectric constant (or relative permittivity) $\varepsilon_{ij}(z,\phi)$. Mud resistivity and standoff distance can also be added in case they will be inputs or outputs of the inversion scheme. A mathematical representation of the optimization problem is shown in Equation (1). In resistive environments phase difference measurement includes most of the information about the resistivity parameter of the formation, while the amplitude ratio includes most of the information about the dielectric parameter of the formation. In conductive environments this relationship can be reversed where amplitude ratio measurement includes most of the information about the resistivity parameter of the formation, while the phase difference includes most of the information about the dielectric parameter of the formation. As a result, in order to properly conduct inversion of both resistivity and dielectric constant parameters, both phase difference and amplitude ratio information needs to be used. Here argmin(·) function yields the value of its arguments that are listed below the function name. |·| is the norm function, $K_p$ and $K_{ar}$ are weights for the phase and amplitude terms respectively. log(·) function is the natural logarithm function.

$$\operatorname*{argmin}_{\substack{R(z,\phi_t),\\ \varepsilon(z,\phi_t),\\ Rm,\varepsilon m,d}} \left( \begin{array}{l} K_p |PD_{ij}^{lib}(R(z,\phi_t), \varepsilon(z,\phi_t), Rm, \varepsilon m, d) - PD_{ij}(z,\phi_t)| + \\ K_{ar} |\log(AR_{ij}^{lib}(R(z,\phi_t), \varepsilon(z,\phi_t), Rm, \varepsilon m, d)) - \log(AR_{ij}(z,\phi_t))| \end{array} \right) \quad (1)$$

The distance between the received signal and each entry in library may be compared and the arguments, the one which produces the minimum may be chosen as the inversion result. If mud parameters and stand-off effects are negligible or well-known, the following minimization can be performed instead:

$$\operatorname*{argmin}_{R(z,\phi_t),\varepsilon(z,\phi_t)} \left( \begin{array}{l} K_p |PD_{ij}^{lib}(R(z,\phi_t), \varepsilon(z,\phi_t)) - PD_{ij}(z,\phi_t)| + \\ K_{ar} |\log(AR_{ij}^{lib}(R(z,\phi_t), \varepsilon(z,\phi_t))) - \log(AR_{ij}(z,\phi_t))| \end{array} \right) \quad (2)$$

Inversion Application (Isotropic)

Figure 12:
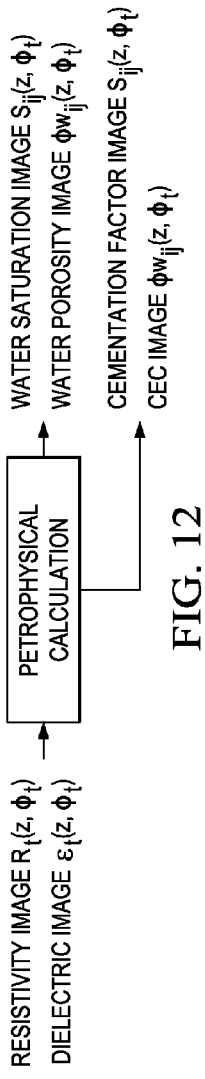
FIG. 12 shows illustrative isotropic inversion applications.

As shown in FIG. 12, the output of the proposed tool can benefit both petrophysical and stratigraphical interpretation.

Figure 13:
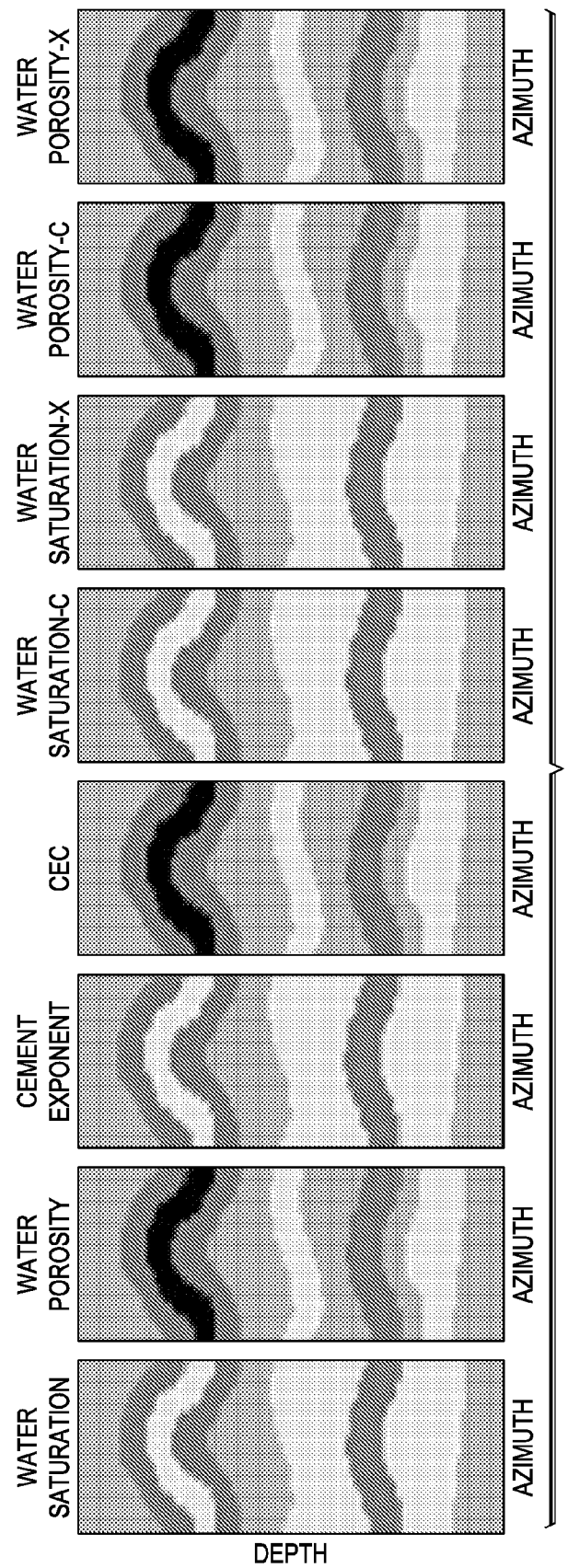
FIG. 13 shows an illustrative set of petrophysical parameter images for isotropic inversion.

Conversion of resistivity/dielectric to water saturation and porosity can be performed by utilizing one of the well-known petrophysical models. Calculation of cementation factor and cation exchange capacity (CEC) are also well-known in non-azimuthal logging. The image can give information about the water saturation associated with inhomogeneities along the borehole, such as fractures. It can also help better understand azimuthal variations of resistivity, dielectric constant and petrophysical parameters such as water saturation, water porosity, cementation exponent and cation exchange capacity (CEC) due to differing formation pressures in different sides of the borehole. It is also possible to make images of petrophysical parameters as illustrated in FIG. 13.

Figure 14:
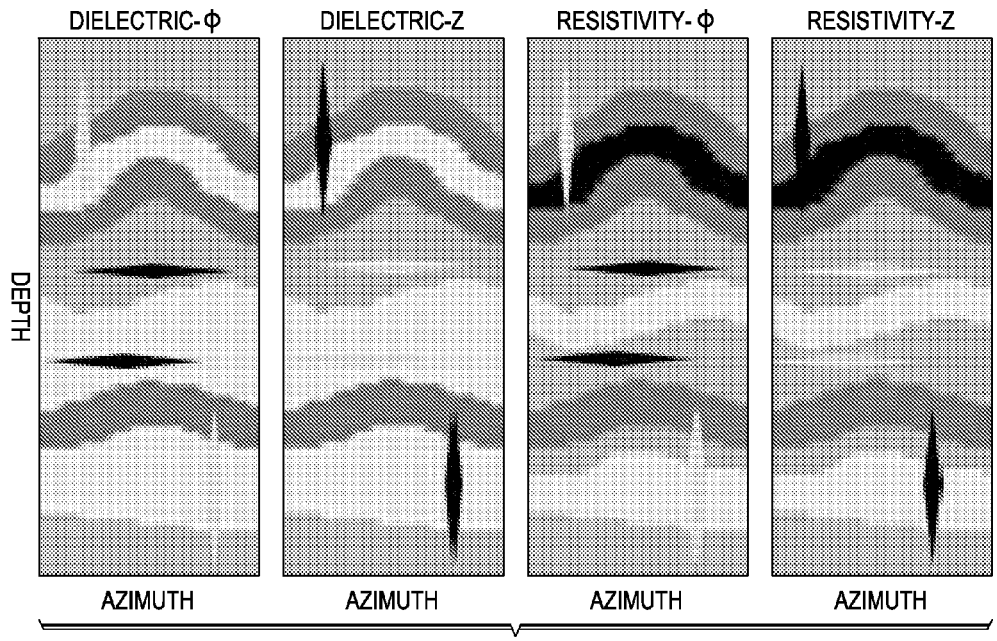
FIG. 14 shows an illustrative set of polarization images.

Images with different polarizations can be used to sense better features that are oriented in different directions. Multiple images with different polarizations can be used as shown in FIG. 14 to focus on different features.

In addition, cross polarization signals ($V_{\rho\phi}$, $V_{\phi z}$, or $V_{\rho z}$) can be used, if available, to identify dipping or structural effects. It can also serve as a dipmeter similar to traditional borehole imagers. Due to higher frequency, and lower penetration, image depth uncertainty issues can be addressed, and a better estimate of dip can be calculated.

Inversion (Anisotropic)

Figure 15:
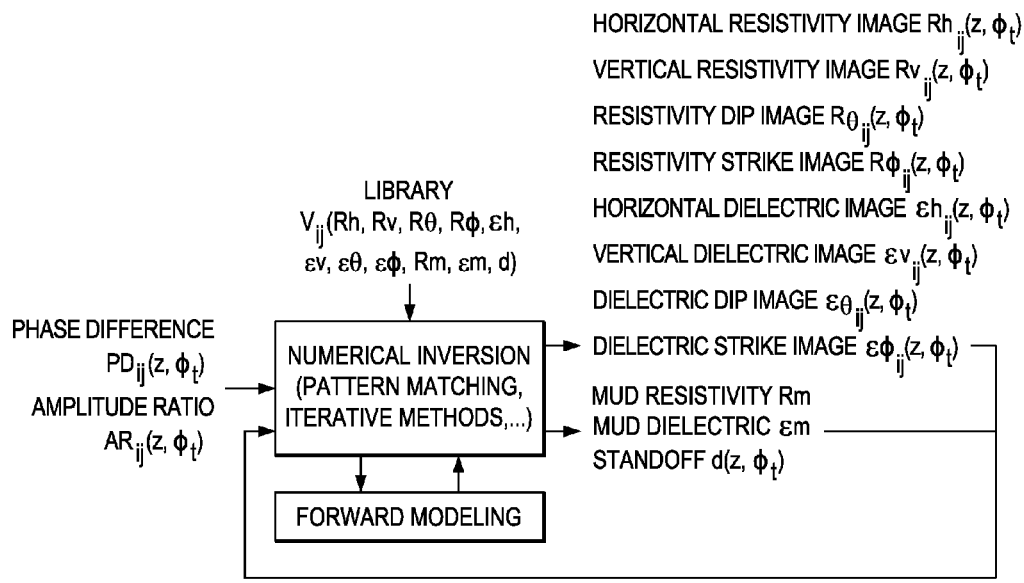
FIG. 15 shows an illustrative anisotropic inversion methodology.

A basic inversion methodology is shown in FIG. 15. A signal may be obtained from the receivers as a function of z and $\phi_t$.

Parameters that are related to anisotropic electric permittivity effects, in general, are not simple functions of the tool response. As a result, a simple algebraic function cannot be used to obtain the desired parameters. Instead, an inversion scheme may be used to match the received signal, either to a forward model, or to a modeling library. The library may be composed of at least the desired anisotropic formation parameters: horizontal resistivity $Rh_{ij}(z,\phi)$, vertical resistivity $Rv_{ij}(z,\phi)$, relative resistivity dip $R\theta$, relative resistivity strike $R\phi$ horizontal dielectric constant $\varepsilon h_{ij}(z,\phi)$, vertical dielectric constant $\varepsilon v_{ij}(z,\phi)$, relative permittivity dip $\varepsilon\theta$, relative permittivity strike $\varepsilon\phi$. Mud resistivity and standoff distance can also be added in case they will be inputs or outputs of the inversion scheme. A mathematical representation of the optimization problem is shown in Equation (3).

$$\operatorname*{argmin}_{\substack{Rh(z,\phi_t),Rv(z,\phi_t),\\ R\theta(z,\phi_t),R\phi(z,\phi_t),\\ \varepsilon h(z,\phi_t),\varepsilon v(z,\phi_t),\\ \varepsilon\theta(z,\phi_t),\varepsilon\phi(z,\phi_t),\\ Rm,\varepsilon m,d}} \left( \begin{array}{l} K_p \left| \begin{array}{l} PD_{ij}^{lib}(Rh(z,\phi_t), Rv(z,\phi_t), R\theta(z,\phi_t), R\phi(z,\phi_t), \varepsilon h(z,\phi_t), \\ \varepsilon v(z,\phi_t), \varepsilon\theta(z,\phi_t), \varepsilon\phi(z,\phi_t), Rm, \varepsilon m, d) - PD_{ij}(z,\phi_t) \end{array} \right| + \\ K_{ar} \left| \begin{array}{l} \log(AR_{ij}^{lib}(Rh(z,\phi_t), Rv(z,\phi_t), R\theta(z,\phi_t), R\phi(z,\phi_t), \varepsilon h(z,\phi_t), \\ \varepsilon v(z,\phi_t), \varepsilon\theta(z,\phi_t), \varepsilon\phi(z,\phi_t), Rm, \varepsilon m, d)) - \log(AR_{ij}(z,\phi_t)) \end{array} \right| \end{array} \right) \quad (3)$$

The distance between the received signal and each entry in library may be compared and the arguments, the one which produces the minimum may be chosen as the inversion result. If mud parameters and stand-off effects are negligible or well-known, the following minimization can be performed instead. Due to symmetry, three strike angles that are required in the library, which are tool measurement azimuth $\phi_t$ and resistivity strike $R\phi$ (with respect to earth), dielectric strike $\varepsilon\phi$ (with respect to earth), can be reduced to one that is based on the azimuthal difference between the strike of formation parameters and tool measurement azimuth.

$$\operatorname*{argmin}_{\substack{Rh(z,\phi_t),Rv(z,\phi_t),\\ R\theta(z,\phi_t),R\phi(z,\phi_t),\\ \varepsilon h(z,\phi_t),\varepsilon v(z,\phi_t),\\ \varepsilon\theta(z,\phi_t),\varepsilon\phi(z,\phi_t)}} \left( \begin{array}{l} K_p \left| \begin{array}{l} PD_{ij}^{lib}(Rh(z,\phi_t), Rv(z,\phi_t), R\theta(z,\phi_t), R\phi(z,\phi_t), \varepsilon h(z,\phi_t), \\ \varepsilon v(z,\phi_t), \varepsilon\theta(z,\phi_t), \varepsilon\phi(z,\phi_t)) - PD_{ij}(z,\phi_t) \end{array} \right| + \\ K_{ar} \left| \begin{array}{l} \log(AR_{ij}^{lib}(Rh(z,\phi_t), Rv(z,\phi_t), R\theta(z,\phi_t), R\phi(z,\phi_t), \varepsilon h(z,\phi_t), \\ \varepsilon v(z,\phi_t), \varepsilon\theta(z,\phi_t), \varepsilon\phi(z,\phi_t))) - \log(AR_{ij}(z,\phi_t)) \end{array} \right| \end{array} \right) \quad (4)$$

Inversion Application (Anisotropic)

Figure 16:
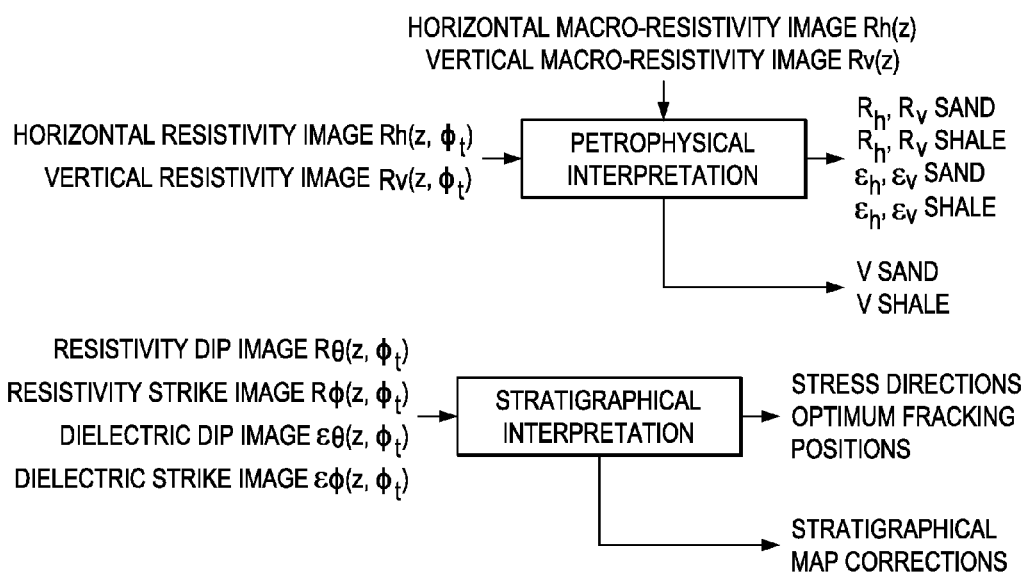
FIG. 16 shows illustrative anisotropic inversion applications.

As shown in FIG. 16, the output of the proposed tool can benefit both petrophysical and stratigraphical interpretation.

Figure 17:
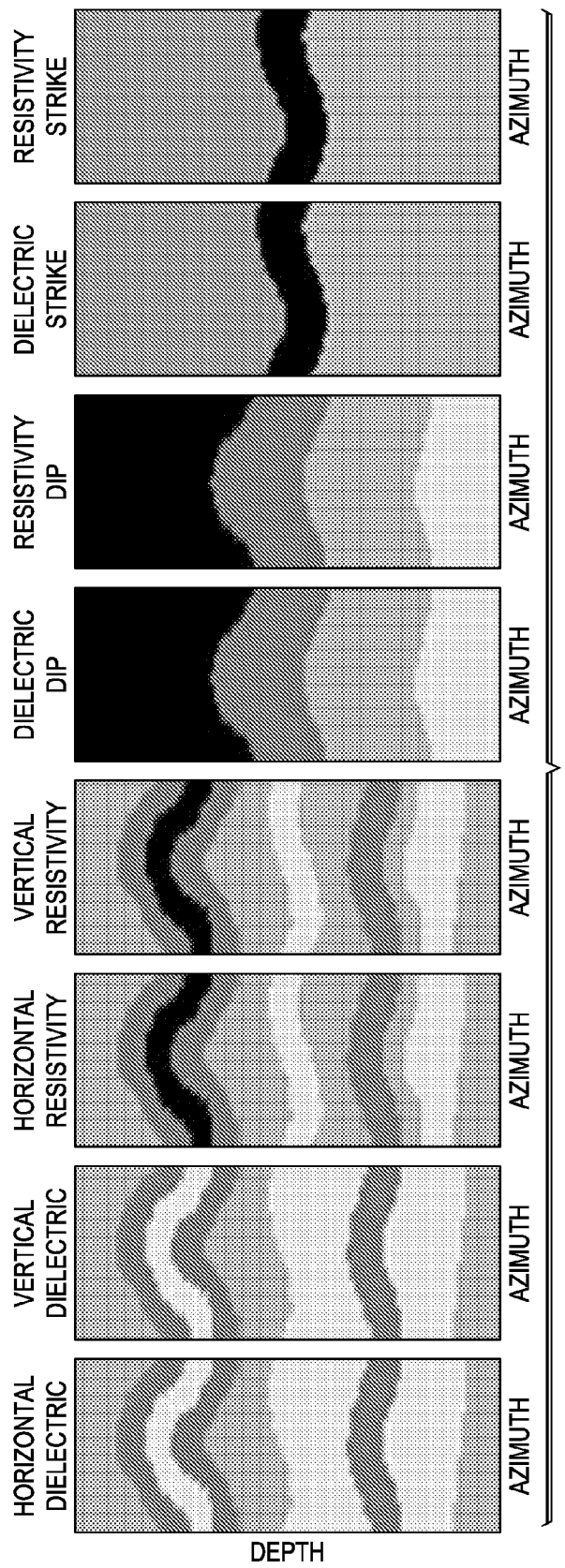
FIG. 17 shows an illustrative set of petrophysical parameter images for anisotropic inversion.

Images of all anisotropic resistivity and dielectric constant parameters can be plotted as a function of depth and azimuth as shown in FIG. 17. It can also help better understand azimuthal variations of resistivity and dielectric constant due to differing formation pressures in different sides of the borehole. It can also serve as a Dipmeter similar to traditional borehole imagers, similar to the isotropic application case with the same advantages. Azimuthal resistivity and dielectric information can be used to make better interpretation of laminations that are thinner than the resolution of traditional resistivity tools. Anisotropic resistivity and dielectric information can allow calculation of resistivity and dielectric of layers that make up the laminations, similar to traditional sand/shale calculations with multi-component tools.

Inversion Generalization

The inversion library in the above discussion utilized homogeneous formation models only. However, inversion accuracy close to layer boundaries can be significantly improved by using a two or more layer formation model in the library or forward modeling in the inversion. In addition, a 3D formation model that includes radial variations such as invasion can also be utilized. This may allow inversion of invasion zone resistivity and dielectric parameters, as well as virgin zone resistivity and dielectric parameters, as well as corresponding images as a function of the depth and azimuth for each.

In general, inversion of properties at a single azimuth can use information that is obtained in that azimuth, or it may also involve information from adjacent measurements. Different measurement polarizations may also be combined to increase the resolution of image. For example, use of both horizontal and vertical dipole polarizations can allow images that have good resolution for features that are both horizontally and vertically oriented. Normally $\phi$-z polarizations help with imaging, while $\rho$ polarization can help with inversion of the borehole stand-off parameters. Here z is along the borehole axis, $\phi$ is azimuthal angle direction in cylindrical coordinates, and p is the radial angle in cylindrical coordinates.

Depletion of conventional hydrocarbon resources and easy-to-access oil prompted rapid development of advanced sensing technologies for oil field applications. Recently, these advances have been focused on measurement of resistivity anisotropy (multi-component induction tools) and multi-frequency dielectric. Embodiments described herein extend capabilities into imaging.

Figure 18:
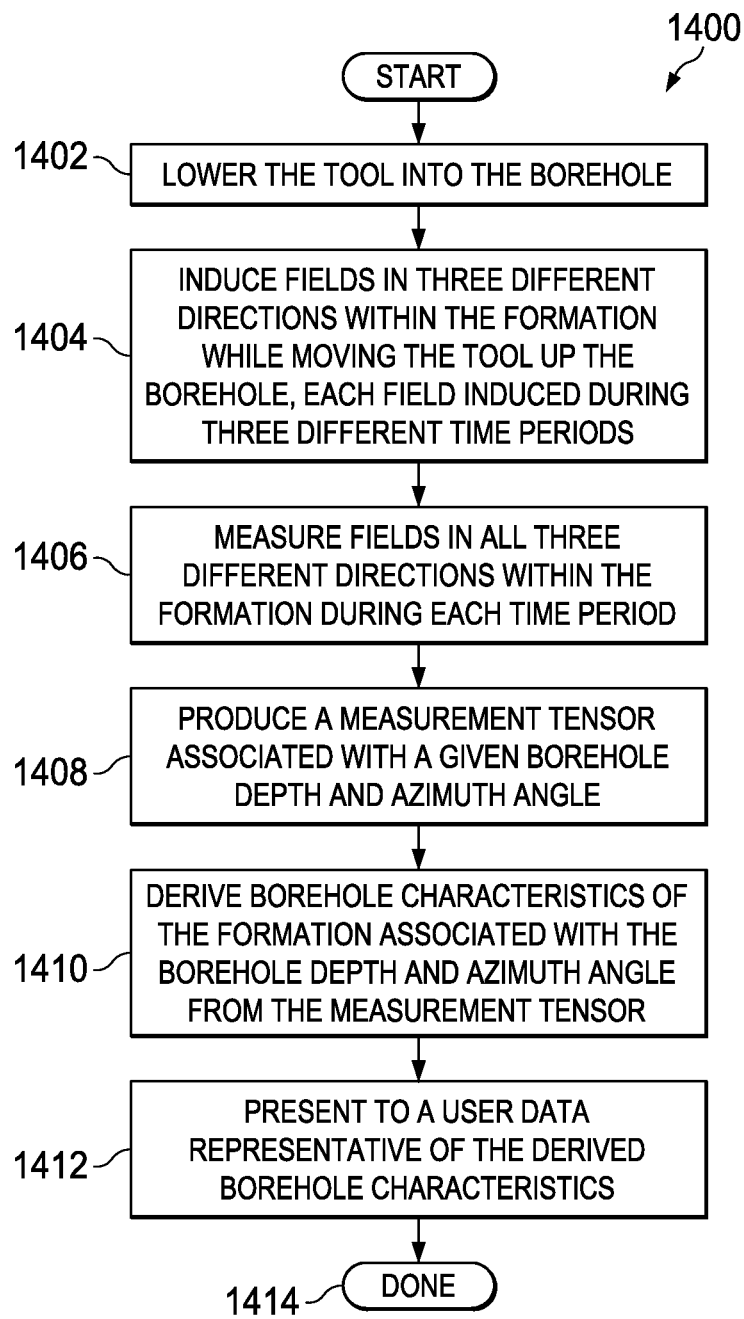
FIG. 18 shows an illustrative method according to one embodiment.

FIG. 18 shows an illustrative method for using the tools and systems described above. An illustrative borehole imaging tool is lowered into the borehole (block 1402), and as it is pulled back up the borehole, the tool periodically induces fields in three different directions within the formation for a given depth and azimuth angle, each field induced during three separate time periods (block 1404). During each time period, field measurement samples are taken in all three directions (block 1406). The measurements may be electric field measurements or magnetic field measurements (or both), and may be expressed either directly as field strength measurements or indirectly as corresponding electrical current or electric potential measurements. A measurement tensor is produced (e.g., a 3×3 voltage measurement tensor) that is associated with a given borehole depth and tool azimuth angle (block 1408). The borehole characteristics at the given depth and azimuth angle are derived from the measurement tensor (block 1410) by using, for example, the inversion process described above. The derived data is then presented to a user of the tool (block 1412), ending the method (block 1414).

Numerous other modifications, equivalents, and alternatives will become apparent to those skilled in the art once the above disclosure is fully appreciated. For example, although three orthogonal emitters and sensors are used in a tri-axial configuration in the embodiments described, different numbers of emitters and/or sensors may also be used, and such emitters and/or sensors may be configured in a non-orthogonal orientation. Also, additional focusing and guard rings may be added to the galvanic transducer pads described to provide additional control over the direction of the current flowing through the formation to/from such transducer pads. Further, although each type of emitter and sensor (galvanic, capacitive and inductive) was discussed individually, at least some embodiments combine several of these into a single instrument and include combined concurrent measurements within the measurement tensors. The programmable downhole processor is just one example of a suitable downhole controller, and it could be replaced or augmented with an integrated or hardwired controller. It is intended that the following claims be interpreted to embrace all such modifications, equivalents, and alternatives where applicable.

It should be apparent from the foregoing that an invention having significant advantages has been provided. While the invention is shown in only a few of its forms, it is not limited to only these embodiments but is susceptible to various changes and modifications without departing from the spirit thereof.

The invention claimed is:

1. A dielectric borehole imaging tool for use in a borehole extending through a subterranean formation, the borehole having a borehole wall, the tool comprising: one or more transmitters that induce, at azimuthally-spaced positions on the borehole wall, a plurality of fields having components in non-coplanar directions within the formation; directionally sensitive inductive receivers configured to sense the components caused by each of the one or more transmitters; and a controller configured to process signals received from the directionally sensitive inductive receivers to provide a set of measurements representative of dielectric parameters and resistivity at two or more azimuthal positions within the borehole, wherein the dielectric parameters comprise a dielectric constant in horizontal and vertical directions.

2. The tool of claim 1, wherein the receivers each comprise:
two receivers in a horizontal arrangement;
two receivers in a vertical arrangement;
three receivers in a horizontal arrangement;
three receivers in a vertical arrangement; or
an array of receivers in horizontal and vertical arrangements.

3. The tool of claim 1, wherein at least one of the said plurality of fields have a different frequency compared to the others.

4. The tool of claim 1, wherein said one or more transmitters or receivers are electrical dipoles or magnetic dipoles.

5. A multi-axial induction borehole imaging system for use in a borehole extending through a subterranean formation, the borehole having a borehole wall, the system comprising: a tool body movable within the borehole through the formation and comprising one or more sensor pads configured to measure dielectric parameters as a function of position and azimuth on the borehole wall, wherein each sensor pad comprises a set of one or more transmitters and one or more receivers respectively configured to induce and sense one or more fields within the formation, wherein the one or more receivers are configured to provide signals representative of independent directional components of the one or more fields; a downhole controller configured to process the signals to provide a set of measurements representative of dielectric parameters of the formation at each position and azimuth; and a computer system configured to receive and derive from the set of measurements one or more borehole characteristics comprising dielectric parameters and resistivity associated with each position and azimuth and further presents to a user data representative of at least one of the one or more borehole characteristics, wherein the borehole characteristics comprise dielectric constant in two different directions, and wherein said two different directions are horizontal and vertical directions.

6. The system of claim 5, wherein at least one of the fields is different frequency compared to others.

7. The system of claim 5, wherein the sensor pads are embedded in the tool body.

8. The system of claim 5, wherein the sensor pads are configured to couple to and extend away from a central portion of the tool body towards the borehole wall.

9. A dielectric borehole imaging method comprising: lowering a dielectric borehole imaging tool into a borehole through a formation; at each of multiple positions on the borehole wall, inductively inducing multi-frequency fields having linearly-independent directional components within a formation; inductively detecting the directional field components to obtain, as a function of azimuthal angle and position in the borehole, measurements representative of dielectric parameters of the formation from the detected field components; deriving from the measurements one or more borehole characteristics comprising dielectric parameters and resistivity as a function of the azimuthal angle and position in the borehole; and presenting to a user data representative of the one or more borehole characteristics; wherein the one or more borehole characteristics comprise dielectric constant in two different directions, and wherein said two different directions are horizontal and vertical directions.

10. The method of claim 9, wherein at least one of the fields is at a different frequency compared to others.

11. The method of claim 9, wherein presenting to a user data comprises constructing a two dimensional image of the dielectric constant where the dimensions of the image are azimuthal and axial directions.

12. The method of claim 9, wherein presenting to a user data comprises constructing a two dimensional image of the dielectric constant where the dimensions of the image are radial and axial directions.

13. The method of claim 9, wherein the one or more borehole characteristics comprise dielectric parameters and resistivity.

14. The method of claim 13, wherein dielectric and resistivity parameters are obtained at each frequency; and wherein petrophysical calculations are used to compute water saturation, water porosity, cement exponent, cation exchange capability, or combinations thereof.

15. The method of claim 14, wherein the one or more borehole characteristics comprise one or more characteristics selected from the group consisting of: water saturation, water porosity, cement exponent, cation exchange capability, and combinations thereof.

16. The method of claim 15, wherein presenting to a user data comprises constructing a two dimensional image of the water saturation, water porosity, cement exponent, cation exchange capability where the dimensions of the image are azimuthal and axial directions.

17. The method of claim 15, wherein presenting to a user data comprises constructing a two dimensional image of the water saturation, water porosity, cement exponent, cation exchange capability where the dimensions of the image are radial and axial directions.

18. The method of claim 9, wherein the deriving comprises isotropic inversion or anisotropic inversion.

19. The method of claim 9, wherein the deriving utilizes one or more cross polarization signals.

* * * * *